F. BAIN.
PNEUMATIC TIRE.
APPLICATION FILED MAR. 17, 1913.

1,132,998.

Patented Mar. 23, 1915.

Witnesses:
Robert F. Weir
Arthur W. Carlson

Inventor
Forée Bain
Forée Bain & May
Attys.

UNITED STATES PATENT OFFICE.

FORÉE BAIN, OF LA GRANGE, ILLINOIS, ASSIGNOR TO FEDERAL RUBBER MANUFACTURING COMPANY, OF MILWAUKEE, WISCONSIN, A CORPORATION.

PNEUMATIC TIRE.

1,132,998.            Specification of Letters Patent.     Patented Mar. 23, 1915.

Application filed March 17, 1913. Serial No. 754,702.

*To all whom it may concern:*

Be it known that I, FORÉE BAIN, a citizen of the United States, residing at La Grange, in the county of Cook and State of Illinois, have invented certain new and useful Improvements in Pneumatic Tires, of which the following is a specification.

My invention relates to improvements in pneumatic tires for the wheels of vehicles and more especially for automobiles.

One of the objects of my invention is to provide a structure whereby I am enabled to decrease the cost of construction; to increase the stability of the tire, especially in its capability to resist lateral strains due to thrusts, as when "skidding" or in making short rapid turns around corners; and to increase the durability of the structure to withstand greater wear, by substituting metal side walls, such as steel or the like, for the usual integral side walls of more fragile and shorter lived rubber fabric which forms the outer casing of the tire.

In my improved tire I provide for accommodating tread-displacement by permitting the tread member of the tire to move inwardly on direct radial lines instead of causing the side walls to move outwardly, or laterally, to permit displacement of the tread member due to the imposed load, as in the usual tire casing. Furthermore I arch the tread member transversely, thereby to strengthen it to a great degree and to permit maximum projection from the rim consistent with the quantity of material contained in the tread portion.

In the all-fabric tires heretofore constructed, it is outward or lateral movement that causes constant reoccurrence of flexing of the side walls thereof, which produces granulation of the component materials resulting in side splitting and rim cutting.

Figure 1:
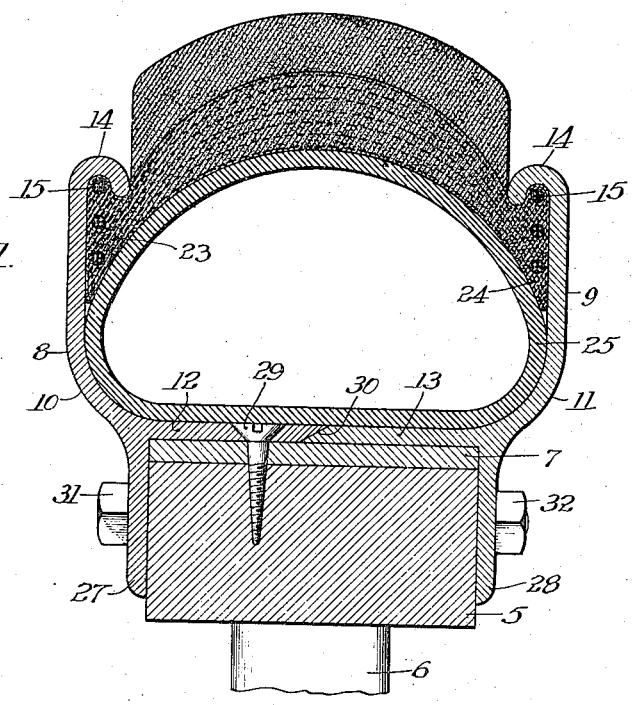
Figure 2:
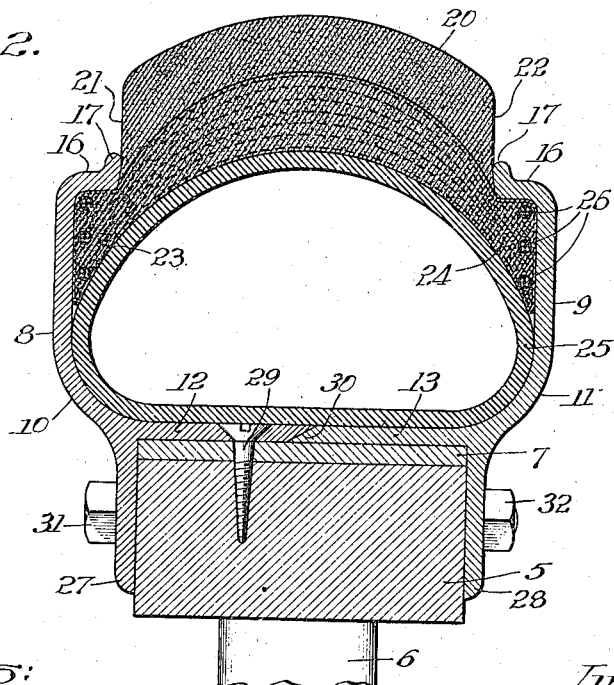

In the specific embodiment, which I have chosen to illustrate my invention, for purposes of clear disclosure, Figure 1 is a cross sectional view of a conventional wheel with my tire attached thereto; and Fig. 2 is a similar view showing a slight modification of the metal channel and rim.

In both views the same reference characters indicate similar parts.

The felly 5 of the wheel may be of any convenient form or type, supported by the spokes 6. A circumferential flat steel tire or band 7 may surround the felly 5 to provide a wearing surface and to assist in holding the wheel parts together.

As a substitute for the usual side walls of the fabric outer casing of a tire I provide sheet metal side walls 8 and 9, each curved inwardly at their mid-parts, as at 10 and 11 respectively, to join said radially placed side walls with the rim parts 12 and 13, respectively. The radially extending, flat, side walls 8 and 9 are each turned inwardly at their free circumferential edges, thereby providing laterally extending flanges. In Fig. 1 the inwardly turned flange parts are transversely curved, as at 14, to provide circumferential channels 15 that confront the axis of the wheel. In Fig. 2 the upper circumferential edges of the side walls are more abruptly inturned, as at 16, and then turned radially, as at 17, thereby to provide enlarged flange bearing-surfaces to better resist the lateral strain imparted to the tire.

The flexible tread member 20 is transversely arched of substantially uniform cross section and is, preferably, composed of the best sea island fabric having vulcanized rubber properly incorporated therewith. It is provided with radially extending, flat, annular, surfaces 21 and 22 one on each of its respective sides to permit the required inward movement of the tread, within the metal side wall members 8 and 9, as when the wheel strikes a small obstruction in its path and when it is rotated and carrying an imposed load. Inwardly, from the flat side surfaces 21 and 22, and at substantially the transversely circular limits of the tread, at each side, I provide laterally-projecting, circumferentially-extending integral wedge-shaped flanges 23 and 24, respectively, that underlie the respective inwardly-turned flange portions 14—16 of the side walls 8 and 9. The flanges 14—16 prevent the outward radial displacement of the tread member 20 and retain it against the pressure effected by the compressed air within the inner inflatable tube 25. To strengthen the flanges 23—24 I may embed therein several convolutions of flexible metal cable 26. It will be noted, however, that at these edges there is considerable more fabric for a given area than there is near the mid-portion of the tire, rendering them relatively stronger.

I have shown one method by which one of the metal side members,—as the side member 9—may be removed to displace a defective part or to change treads or inner tubes. The side members each have integrally extending, annular flanges 27 and 28 respectively, and transversely extending annular flanges or rim parts 12 and 13 respectively. The member 8—which is assumed to be located on the inside of the wheel—is designed to remain permanently in association with the wheel and to this end it is secured to the circumferential part of the wheel, as by screws 29, located at intervals around the rim, such screw taking through the parts 7 and 12 into or through the felly 5. The circumferential edge of the rim 12 is undercut, as at 30, to receive the overcut of the companion member 13. Bolts 31 take through the flanges 27 and 28 and through the felly 5, at intervals around the wheel and are secured in place by nuts 32. When the inner tube 25 is properly inflated it will press the projecting flanges 23 and 24 of the tread member into intimate contact with the side walls 8 and 9 and so maintain them, and the inwardly extending parts 14—16 will present outward displacement of the tread member 20. There are no projections or shoulders on either of the parts 8 and 9 to prevent the free inward movement of the tread member 20, and therefore the tread 20 may move as freely inwardly along the side walls of the members 8 and 9 as would be the case if the side walls were composed of flexible fabric that extend laterally or bulge outwardly to accommodate such inward movement of the tread member.

While I have herein described one embodiment of my invention, and a slight modification thereof, it is evident that the device is susceptible of further modifications and variations within the definition and contemplation of the appended claim.

What I claim is:

A pneumatic tire, comprising a relatively deep, metal, channel rim, having parallel side walls with their circumferential free edges inturned for engagement with a tread member; a circumferentially-extending resilient tread member, having its mid portion transversely arched, and of substantially uniform cross-section, and having laterally projecting, integral annuli, for engagement with the inturned portions of said rim, said integral annuli being widened out at their outer edges to provide large bearing surfaces against the side walls of said channel rims but of less radial depth than the parallel walls; a plurality of metallic cables disposed in the outer edges of the widened out portions of the integral annuli, and an inner pneumatic tube, which, when inflated, holds said annuli in engagement with the sides of the channel rim.

In testimony whereof I hereunto set my hand in the presence of two witnesses.

FORÉE BAIN.

In the presence of—
Geo. T. May, Jr.,
Mary F. Allen.